Oct. 17, 1939.　　　R. E. DERBY　　　2,176,706
METHOD OF PREPARING CLOTH FOR FULLING
Filed March 18, 1939　　　5 Sheets-Sheet 1

Inventor.
Roland E. Derby
by Heard Smith & Tennant.
Attys.

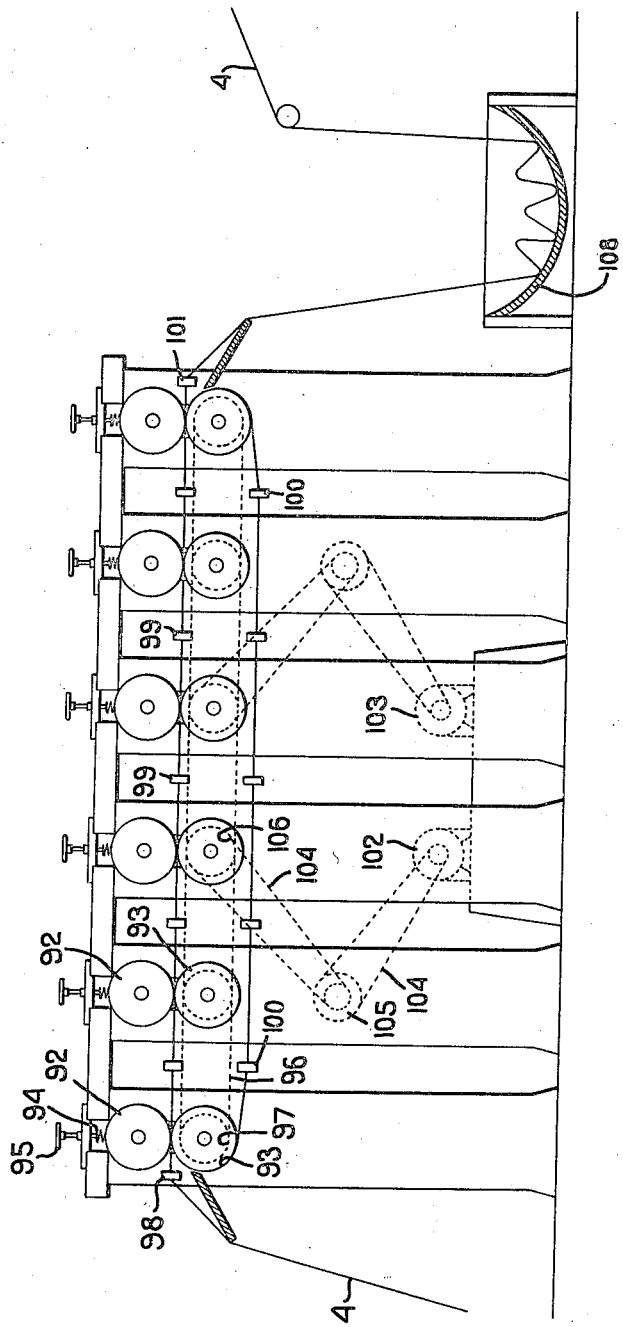

Oct. 17, 1939.                R. E. DERBY                2,176,706
                  METHOD OF PREPARING CLOTH FOR FULLING
                     Filed March 18, 1939          5 Sheets-Sheet 5
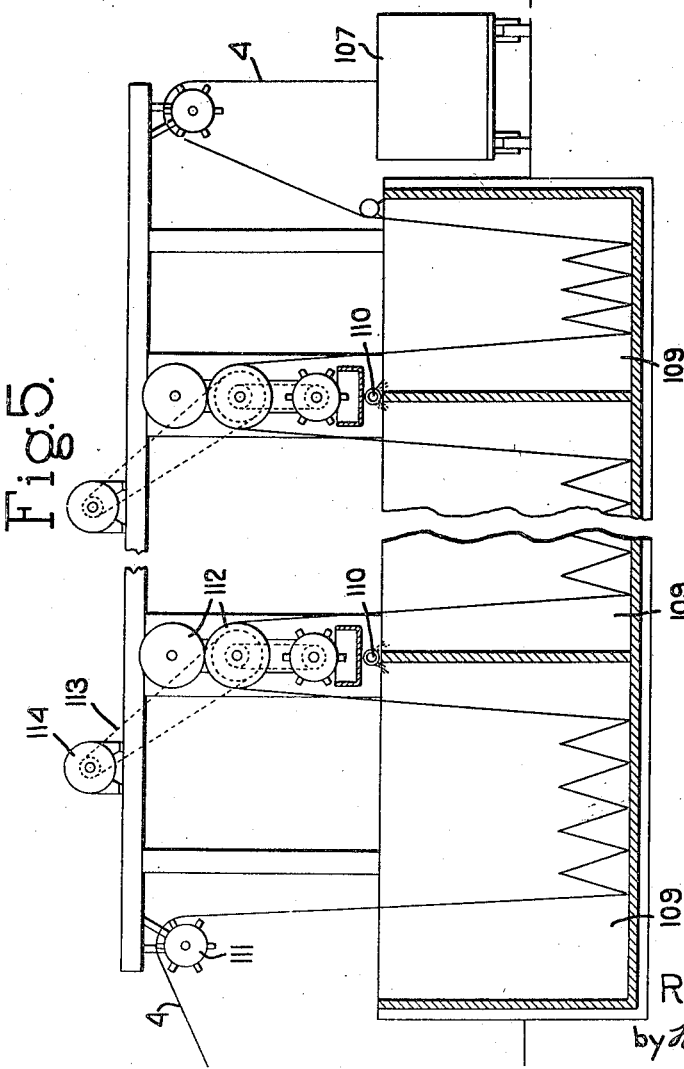
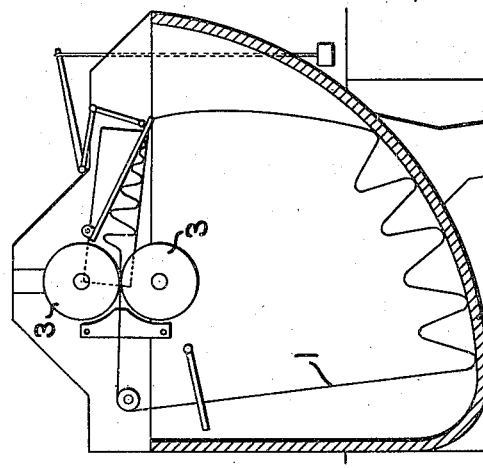
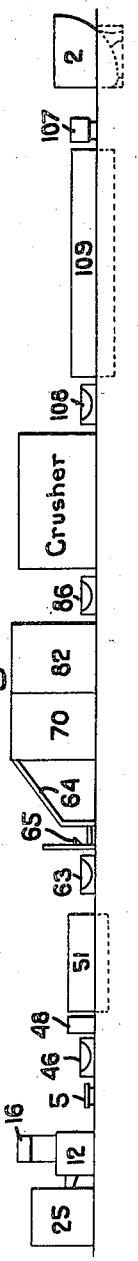
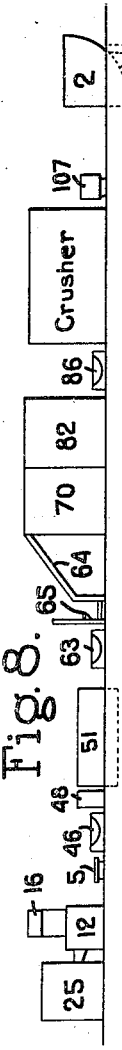
Inventor.
Roland E. Derby
by Heard Smith & Tennant.
Attys.

Patented Oct. 17, 1939

2,176,706

UNITED STATES PATENT OFFICE 2,176,706

METHOD OF PREPARING CLOTH FOR FULLING

Roland E. Derby, Tyngsboro, Mass., assignor to M. T. Stevens & Sons Co., North Andover, Mass., a corporation of Massachusetts Application March 18, 1939, Serial No. 262,699

6 Claims. (Cl. 8—139.1)

This application is a continuation-in-part of my application Serial Number 256,776, filed February 16, 1939.

This invention relates to the treatment of cloth containing animal fibre, such as woolen or worsted cloth, to place it in proper condition for fulling.

After the cloth leaves the loom, it has to be subjected to various operations to remove substances undesirable in the finish of the cloth such as natural grease, oil employed in preparatory steps, tar and other foreign substances, tinting materials used in identifying the yarns, burrs and other foreign vegetable material, as well as operations to remove materials employed in carrying out the removal of such undesired substances. Such treatment of the cloth has heretofore been carried out by a plurality of separate and independent operations.

It is the object of the present invention to apply to the preparation of the cloth for fulling the so-called "straight line" method which has proved so economical and successful in various industries so that the cloth may be taken in the condition in which it leaves the loom and placed in condition for fulling by a continuous and progressive application to a continuous web of the cloth in sequence but simultaneously of all the various treatments required for the purpose. Thus with this invention there is a steady, even flow of the cloth in unlimited length of web through a required series of operations successively and simultaneously taking place until it is ready for fulling.

The invention thus has for its object to reduce labor cost, to save floor space, to eliminate rehandling and transportation of pieces of cloth between the various required treatments as well as to insure uniformity of the preparatory treatments and consequently uniformity of the condition of the cloth when ready for fulling.

The invention has for its further object a method of continuously and progressively preparing a continuous web of cloth containing animal fibre, such as woolen or worsted cloth, for acid fulling.

The invention has for its further object a method of continuously and progressively preparing a continuous web of cloth containing animal fibre, such as woolen or worsted cloth, for alkaline or soap fulling.

The nature and objects of the invention will appear more fully from the accompanying description and drawings and will be particularly pointed out in the claims.

The drawings illustrate more or less diagrammatically various machines and appliances which conveniently and preferably may be employed in carrying out the various steps of the method of this invention.

Figs. 1 to 5, inclusive, are views chiefly in side elevation and vertical cross section illustrating a complete series of machines and appliances conveniently employed in carrying out the method of the invention in preparing the cloth for alkaline or soap fulling.

Fig. 6 is a view in side elevation and partially in vertical cross section of a standard type of fulling machine.

Fig. 7 is a schematic view illustrating the machines and appliances shown more in detail in Figs. 1 to 6, inclusive, as arranged when the cloth is to be subjected to alkaline or soap fulling.

Fig. 8 is a view similar to Fig. 7 of a set of similar machines and appliances when the cloth is to be subjected to acid fulling.

In the treatment of cloth containing animal fibre, such as woolen and worsted cloth, a fulling operation is employed thoroughly familiar to those skilled in the art. A standard type of fulling machine is illustrated in Fig. 6. An endless web 1 of cloth is formed by stitching or fastening together a plurality of pieces of cloth to form the endless web and this endless web is continuously circulated in rope form through a liquid contained in the vat 2 and between the pressure rollers 3. Thus the method is essentially a closed one incapable of treating a continuous run of cloth. In the fulling operation either an acid treatment or an alkaline treatment, commonly with soap, may be employed and the present invention prepares the cloth for either of these treatments.

In the case of acid fulling, a long, thorough soap scouring operation is required to remove any oily constituents in the cloth. In the case of soap fulling, after the fulling operation is completed, there has to be a very thorough, long-continued washing not only to remove oil, tar and other foreign substances, but to remove the soap. Frequently the soap employed in the fulling operation leaves the cloth so dirty that the cloth has to be re-soaped and a further washing operation performed to remove the soap thus employed.

With the present invention, all the deleterious foreign substances are removed from the cloth before it comes to the fulling operation, thus enabling the fulling either on the acid or alkaline side to be carried on in most economical and efficient manner and enabling the cloth, after it is taken from the fulling mill, to pass with a minimum amount of further preparation to and through the various finishing operations required in cloth manufacture.

With this invention the pieces of cloth in the condition they come from the loom are stitched or fastened together to form a continuous web of unlimited length and this web progresses continuously through a series of simultaneously performed steps of treatment which prepare it for the fulling operation.

The first step of the method has for its purpose to clean the cloth by removing therefrom oleaginous and other foreign substances without soap scouring operations which are expensive and time-consuming and which frequently fail completely to remove such substances. It is customary for a sheep owner to identify his product by stamping upon the wool certain insignia with paint or tar or a tar-containing mixture and more or less of this marking material remains upon the wool. It is customary also to apply different tints, which are insoluble pigments, to yarns in order that the manufacturer may identify and distinguish similar yarns, which tints are removed with difficulty in the finishing operations. Oil is also customarily employed in the weaving of the cloth. All such oleaginous and foreign substances which are detrimental to the finishing operations and to the appearance of the finished cloth must be removed.

Figure 1:
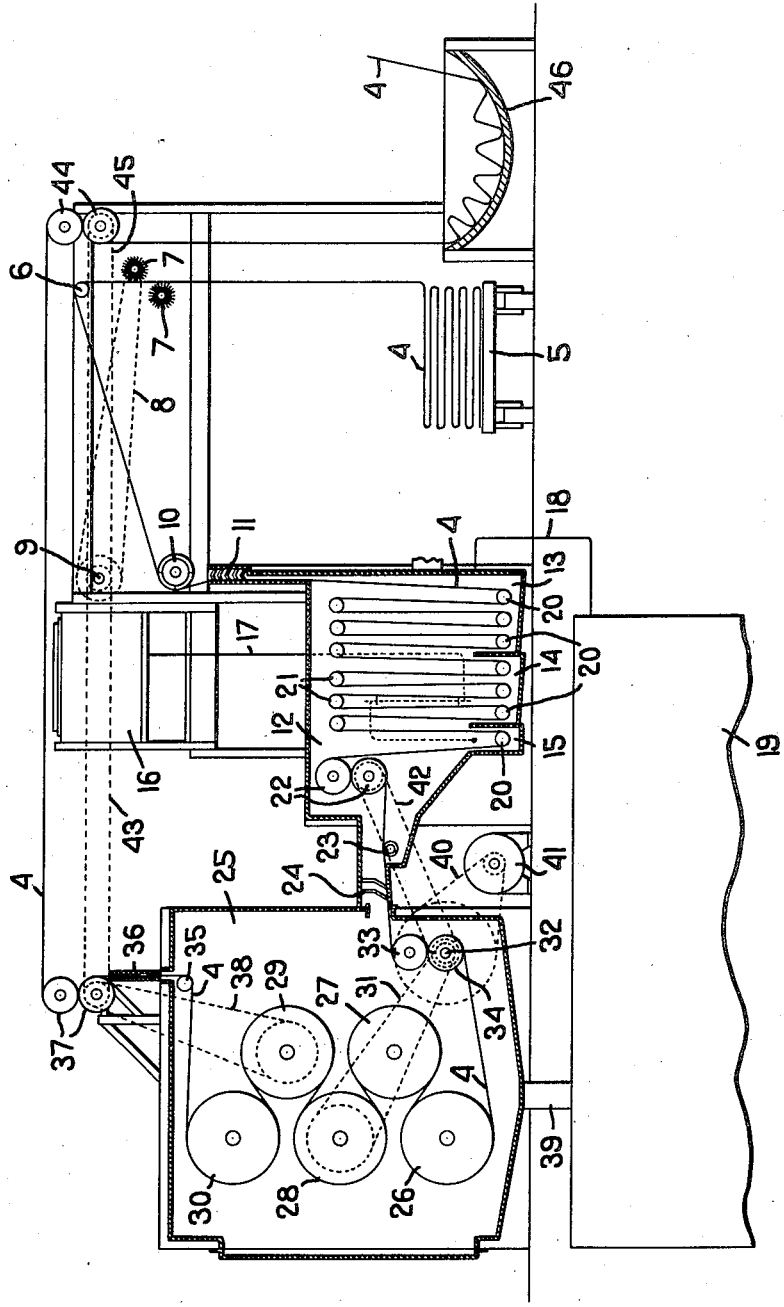

In this first step of the method, these substances are removed by continuously, progressively, and successively (a) passing the cloth through a bath of a suitable liquid solvent, (b) extracting by suction the principal part of the solvent and solvent-retained foreign substances remaining in the cloth, (c) heating the cloth sufficiently to vaporize the solvent remaining therein and (d) separating the cloth from the solvent vapor. For this purpose there may preferably be employed an apparatus such as illustrated in Fig. 1.

The cloth 4 is here shown supported in a pile on a truck 5 and, as the cloth passes off from the truck, the continuity of the web is maintained by bringing up additional cloth and stitching or fastening the ends together. The web of cloth passes up over a guide bar 6 and on its way is preferably subjected to a brushing action on each face by a pair of brushes 7 which may be geared together and driven by a belt 8 from a pulley on a countershaft 9. These brushes act to remove from the cloth any loose fibres. The web then passes over an expander roll 10 which acts in the usual manner to keep the cloth stretched widthwise. The web then passes through a suitable seal 11 into a closed chamber 12. The bottom of this chamber is formed into a plurality of tanks 13, 14 and 15 by transverse partitions. A suitable solvent is fed from a reservoir 16 through a pipe 17 into the tank 15, overflows successively into the tanks 14 and 13, and discharges as at 18 into a suitable solvent recovery apparatus 19 from which it may be returned to the reservoir.

The solvents which are particularly effective for the purpose of this invention are those whose specific gravities are heavier than water and whose vapors are non-inflammable and heavier than air. A number of such solvents are available upon the market. Those particularly effective are the chlorinated hydrocarbons such as carbon tetrachloride, trichlorethylene and tetrachlorethylene or any mixtures of these three. Small percentages of other solvents may be mixed with these solvents. In fact, any mixture of a non-inflammable, chlorinated hydrocarbon with a flammable solvent, which is still non-inflammable as a mixture, will have its major portion consisting of a chlorinated hydrocarbon. The chlorinated hydrocarbons as a class have some cleansing action and, if commercially available and suitable for the particular operation, may be used for the cleansing to the extent that they have a cleansing function.

The web of cloth in the chamber 12 passes around a plurality of guide rolls 20 journalled transversely near the bottoms of the tanks and a plurality of similar guide rolls 21 journalled near the top of the chamber. The web is led down around the first roll 20 up over the first roll 21, then down around the next roll 20 and so on down around the final roll 20, from whence it passes up and between a pair of positively driven feed rolls 22. Thus the web is continuously and progressively passed through the baths of solvent and in the opposite direction to the flow of the solvent so that it is progressively meeting a purer quality of the solvent.

From the feed rolls 22 the web passes over a vacuum extractor 23 and through a seal 24 closing the exit of the chamber 12. The cloth is thus partially cleansed by its passage through the solvent in the tanks 13, 14 and 15 and is finally cleansed by the vacuum extractor. This extractor is in the form of a tube extending transversely of the chamber 12 provided at the top with a slot against which the cloth presses as it travels forward. This vacuum tube is connected to a suitable vacuum pump or vacuum-forming apparatus continuously operating and thus acts by suction to remove the principal part of the solvent and the solvent-retained foreign substances remaining in the cloth. It will be seen that the cloth in passing over the slot of the vacuum tube passes through a narrow transverse zone in which the air pressure upon the one face of the cloth in said zone is maintained sufficiently less than that upon the other face of the cloth to effect the desired extraction. The solvent thus extracted from the cloth may be discharged into the solvent recovery apparatus 19 or any other suitable apparatus purified, recovered, and returned to the reservoir 16.

From the chamber 12 the cloth passes into a heating chamber 25, the function of which is to heat the cloth sufficiently to vaporize the solvent remaining therein. For this purpose the heating chamber is shown as provided with a plurality of heating drums 26, 27, 28, 29 and 30. These drums are preferably metal cylinders heated by steam, geared together and driven by a belt 31 from a pulley on a main shaft 32. The web of cloth as it enters the heating chamber 25 passes around and between a pair of driven feed rolls 33 and 34, the latter of which is secured to the shaft 32. After leaving the heating drum 30, the web passes around a guide roll 35 and out through a narrow, slotted extension 36 around and between another pair of feed rolls 37 conveniently driven by a belt 38 from one of the heating drums. The drums are heated, as by means of steam fed thereto, at sufficient pressure to maintain the temperature in the heating chamber preferably above that of the boiling point of the solvent so that there shall be no danger of solvent vapor condensing upon and being carried out of the heating chamber with the cloth. Consequently, as the cloth leaves the heating chamber, it is separated from the solvent vapor. This vapor being preferably heavier than air may discharge at 39 into the solvent recovery apparatus 19 or may otherwise be recovered and returned to the reservoir 16. The main shaft 32 is shown as driven by a belt 40 from a motor 41 and the feed rolls 22 are shown as driven by a belt 42 from the main shaft 32 and the countershaft 9 is shown as driven by a belt 43 from a shaft of one of the feed rolls 37. After leaving the feed rolls 37, the cloth passes around and between another pair of feed rolls 44 which are shown as driven by a belt 45 from the countershaft 9.

It will thus be seen that in this first step of the method the web of cloth moves at a constant rate of speed so that it is continuously, progressively, and successively passed through the solvent by which it is largely cleaned, then over the vacuum extractor by which the principal part of the solvent and solvent-retained foreign substances remaining in the cloth are removed, then that it is heated sufficiently to vaporize any solvent still remaining in the cloth, and then, as it passes out from the heating chamber, it is separated from the solvent so that it leaves this step of the method thoroughly cleaned of the oleaginous and other foreign substances referred to.

The web of cloth in the next main step of the method is continuously and progressively treated for carbonizing and then carbonized to enable the removal of any foreign substances of vegetable origin such as burrs which cling tenaciously to the wool or other animal fibres. This step of the method may be performed by any suitable acid treatment which will result in the carbonization of the vegetable matter, and enable it thus carbonized to be reduced to dust or powder and freed from the cloth. In the preferred form of the method this step is divided into two successive sub-steps, first, in continuously, progressively and successively (a) moistening the cloth so that it will evenly and readily take up the acid, (b) then passing the thus-moistened cloth through a suitable acid bath until it is thoroughly soaked, and then in expressing or squeezing the acid from the cloth and, second, in (a) continuously and progressively stretching the cloth to a predetermined width and, while the cloth is maintained thus stretched, continuously and progressively drying the cloth and in then (b) continuously and progressively baking the cloth or subjecting it to a high temperature sufficient to carbonize the foreign vegetable material which is to be removed.

Figure 2:
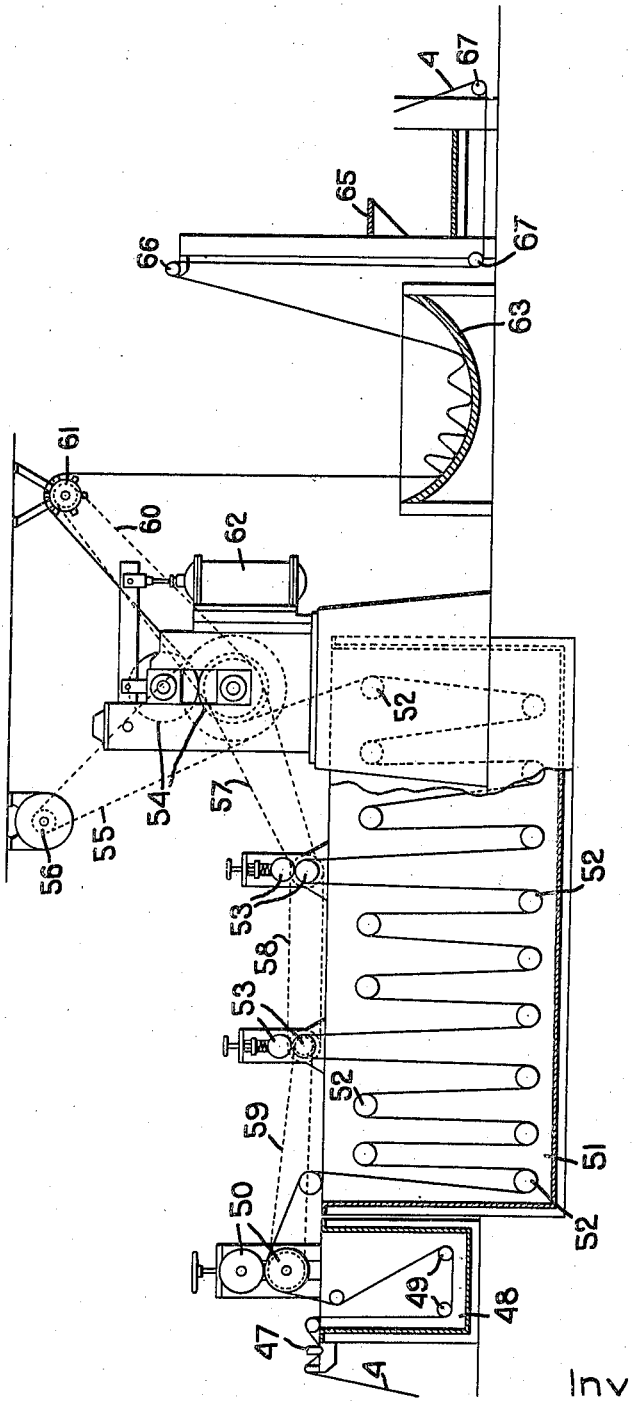

A simple form of apparatus for carrying out the preferred method in this respect of moistening the cloth, then treating it with the acid and then expressing the acid is illustrated in Fig. 2.

A scray 46 is desirably located between the apparatus shown in Fig. 1 and that shown in Fig. 2 so that the web of cloth may accumulate therein and thus compensate for any slight variations in the rates of the progressive movement of the cloth through the two pieces of apparatus. While theoretically the cloth may run at the same speed through both, variations in speed are likely to occur and it is therefore desirable to employ such a scray.

The web 4 of cloth leads from the scray 46 to and through an evener 47 through a tank 48, being guided around suitable guide rolls 49. This tank is supplied with water to effect the wetting of the cloth and thus enable an even and thorough impregnation by and distribution of the acid to take place. The web as it emerges from the tank 48 passes between positively driven feed rolls 50 by which it is withdrawn from the tank and fed into the acid tank 51. This tank is supplied with a suitable acid liquid such as dilute sulphuric acid or aluminum chloride. The cloth web passes down and up over a plurality of guide rolls 52 mounted transversely in the tank 51 so as thoroughly to be soaked by the acid and at intervals passes between pairs of driven squeeze and feed rolls 53. On emerging from the tank, the web passes between a pair of feed and squeeze rolls 54. These rolls are geared together and the lower is shown as driven by a belt 55 from a pulley 56 of a motor or other suitable source of power. The lower rolls of the feed rolls 53 and 50 are also shown as driven successively by belts 57, 58 and 59 from the lower roll 54 and this roll also is shown as driving by a belt 60 the evener 61 over which the web passes from the squeeze feed rolls 54. The upper roll 54 is pressed down to effect the squeezing action by a heavy weight 62. It will thus be seen that the web is first wetted in the tank 48, then thoroughly and evenly impregnated by the acid in the tank 51 and finally the acid is squeezed out by the squeeze rolls 54.

The web of cloth then passes to the next step of the method in which the acid-treated cloth is stretched and dried preparatory to carbonization and is then carbonized. A simple form of apparatus for carrying out the steps of the method is illustrated in Fig. 3.

Figure 3:
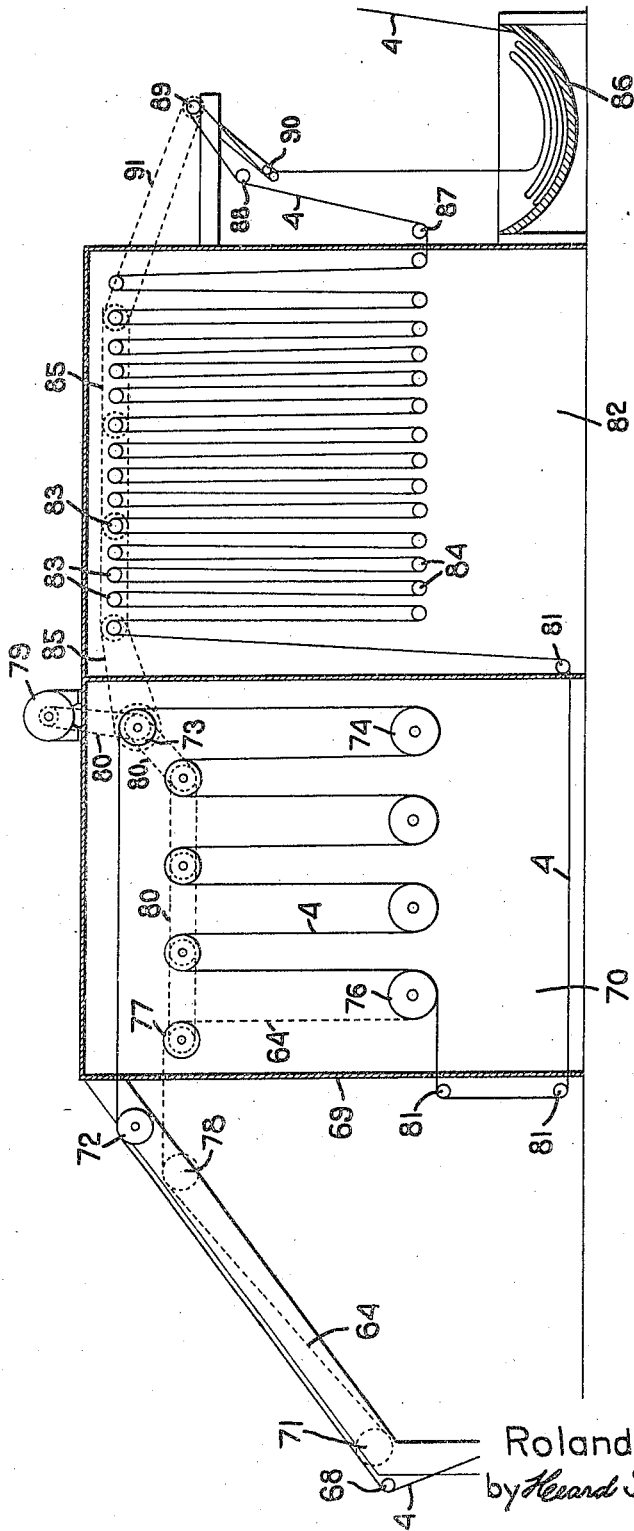

A second scray 63 is provided into which the web of cloth discharges from the acid treatment thus again to compensate for any variations in the rates of movement of the pieces of apparatus shown in Figs. 2 and 3.

The web of cloth is first continuously and progressively stretched to a predetermined width. For this purpose an ordinary endless chain tenter indicated at 64 may be utilized. As illustrated, a seat 65, see Fig. 2, is provided for the operator who guides the web of cloth into the gripping elements of the tenter chain. The web of cloth from the scray is shown leading up over the guide roll 66 down beneath the operator's seat guided by rolls 67 and then up over a guide roll 68, see Fig. 3. The operator adjusts the cloth into the gripping elements of the tenter as it passes continuously and progressively along.

The web of cloth is then, while thus maintained stretched, continuously and progressively dried. As a convenient means for this purpose, a cabinet 69 is provided containing a heated chamber 70. This chamber is preferably treated by hot air blown therethrough and through the cloth, maintaining the temperature in the chamber on the order of 180° to 200° F. The endless chain tenter 64 passes over the guide roll 71, thence over the guide roll 72 into the chamber 70 around the guide roll 73, under the guide roll 74, over the guide roll 75, and so on over the series of rolls as illustrated until it passes from under the guide roll 76, thence over the guide roll 77, over the guide roll 78, and back around the guide roll 71. The upper row of guide rolls in the heating chamber are conveniently driven from a motor 79 or other suitable source of power by belts 80. The cloth in the heating chamber is thoroughly exposed to the heat and thus thoroughly dried. It is shown leaving the tenter at the bottom of the roll 76 and thence passing over guide rolls 81 and into a baking chamber 82 where the web is continuously and progressively baked to carbonize the foreign vegetable material. The cloth in this baking chamber is guided up and down over a series of upper guide rolls 83 and lower guide rolls 84 arranged much as shown in the chamber 70, but in a greater number so as to expose a greater length of the cloth to the baking operation and consequently each unit for a greater length of time to the baking operation. The upper guide rolls, or a selected number, are conveniently driven by the belts 85 from the same source of power as the motor 79. Since the cloth as it progresses through the baking chamber 82 is already dry, the baking is preferably effected by maintaining the interior of the chamber at a high temperature on the order of 220° to 260° F., which may be done by steam coils installed in the chamber. The result of this operation is thoroughly to carbonize the foreign vegetable material which it is desired to remove.

In the next main step of the method, the carbonized material is continuously and progressively removed by a crushing action which frees and discharges the carbonized material in the form of dust.

A preferred form of apparatus for carrying out this step of the method is illustrated in Fig. 4 and thereby the web of cloth is continuously and progressively subjected, while in rope form, to a plurality of crushing operations. While various apparatus may be employed, the preferred apparatus illustrated acts by a progressively advancing reciprocating movement of the web of cloth between a series of crushing rolls which give a series of crushing actions.

Another scray 86 is employed between the steps performed by the apparatus of Fig. 3 and that of Fig. 4 and it is necessary that the web of cloth shall here accumulate because while the action of the apparatus in Fig. 4 is continuous and progressive, it is of a reciprocating character. The web of cloth after leaving the baking chamber 82 passes around guide rolls 87, 88 and 89 to a swinging folder 90 vibrated by a belt 91 driven from one of the rolls 83 and which acts to lay the web of cloth in folds in the scray 86. From this scray the web of cloth passes to the crushing operation.

The apparatus for performing the crushing may be as illustrated in Fig. 4 and comprises a series of pairs of crushing rolls 92—93. The upper rolls 92 are pressed down by springs 94 adjusted by hand wheels 95 upon the lower rolls. These lower rolls are shown as simultaneously driven by a positive means such as a sprocket chain 96 engaging sprocket wheels 97 on each lower roll. The web of cloth, after leaving the scray 86, is brought into rope form and passes through a guide eye 98. From this guide eye the web in rope form passes successively through the pairs of rolls, being repeatedly brought back into rope form by the intermediate guide eyes 99 after passing through each pair of rolls. From the last pair of rolls the web is carried back by guide eyes 100 to enter again the bite of the first pair of crushing rolls and again passes through the crushing rolls and discharges from the machine through the final guide eye 101. Thus the fabric is passed repeatedly through the bites of the crushing rolls. While the crushing rolls may act continuously to advance the web of cloth, it is desirable to increase the crushing effect by alternately rotating the crushing rolls in opposite directions. This reversing action may be secured by providing separate motors 102 and 103, each of which is connected by suitable drives such as sprocket chains 104 and interposed reducing sprocket wheels 105 to a sprocket wheel 106 on one of the rolls 93 and by providing suitable mechanism for alternately clutching and unclutching the motors to the drives. With this type of mechanism, the web of cloth is fed forward between the crushing rolls a given unit length and then backward a lesser length and then forward the unit length so that there is a net forward or advancing movement of the cloth and this net rate of forward movement is maintained equal to the rate of movement of the cloth through the other steps of the method.

The carbonized foreign and vegetable material has now been removed from the web of cloth and, if acid fulling is to take place, the preparation for fulling ends at this stage of the method and the cloth is fed from the crushing apparatus shown in Fig. 4 directly to a suitable truck or other apparatus and is transported to and delivered in sections to the fulling machine. In Fig. 8 there is illustrated schematically a suitable line-up of the pieces of apparatus already described which enables the method of this invention to be carried out in preparing the cloth for acid fulling, the truck 107 being indicated to receive the cloth from the crusher and to transport it to the fulling machine 2.

If, however, alkaline or soap fulling is to be employed, it is necessary to insure the complete neutralization of any acid remaining in the cloth as a result of the treatment preparatory to carbonization. In this case, after the crushing operation has been performed upon the cloth, a further step of the method is performed by which the cloth is continuously and progressively treated to neutralize any acid thus remaining. For this purpose the cloth is passed through one or more baths of a basic aqueous solution such as soda ash or ammonia to effect neutralization and is then in condition to be delivered to the fulling machine. A desirable means for carrying out this step of the method is illustrated in Fig. 5 and in this case the cloth, after leaving the crushing apparatus shown in Fig. 4, is discharged into a scray 108 likewise to take care of any variation in the rates of progressive movement.

The neutralizing apparatus is shown as comprising a plurality of tanks 109 which are continuously supplied with the neutralizing solution as from pipes 110. The cloth, after leaving the scray 108, passes up over an evener 111, accumulates in the first tank and then passes between a pair of feed and squeeze rolls 112, the lower of which is conveniently driven by a belt 113 from a motor 114 or other suitable source of power. This operation is preferably repeated throughout the plurality of tanks, thus alternately impregnating the cloth with the neutralizing solution and expressing it from the cloth. After passing through this apparatus, the web of cloth is ready for being supplied in suitable sections to the fulling machine 2 and may be conveniently discharged into a truck 107 for transportation to the fulling machine.

In Fig. 7 there is illustrated schematically a suitable line-up of the pieces of apparatus already described which enables the method of this invention to be carried out in preparing the cloth for alkaline or soap fulling, the truck 107 being indicated to receive the cloth from the neutralizer and to transport it to the fulling machine 2.

Having thus described the invention, what is claimed as new, and desired to be secured by Letters Patent, is:

1. The method of continuously and progressively preparing for fulling cloth containing animal fibre, as it comes from the loom, which comprises simultaneously performing in sequence upon a continuous web of the cloth the following steps, first, continuously, progressively and successively (a) passing the cloth through a bath of a liquid solvent for oleaginous foreign substances contained in the cloth, (b) extracting by suction the principal part of the solvent and solvent retained foreign substances remaining in the cloth, (c) heating the cloth sufficiently to vaporize the solvent remaining therein and (d) separating the cloth from the solvent vapor, second, continuously, progressively and successively (a) moistening the cloth, (b) passing the moistened cloth through an acid bath (c) expressing the acid from the cloth, third, (a) continuously and progressively stretching the cloth to a predetermined width and while maintained thus stretched continuously and progressively drying the cloth and (b) then continuously and progressively baking the cloth to carbonize foreign vegetable material therein and, fourth, continuously and progressively subjecting the cloth to a plurality of crushing operations to free the carbonized material therefrom.

2. The method of continuously and progressively preparing for alkaline or soap fulling cloth containing animal fibre, as it comes from the loom, which comprises simultaneously performing in sequence upon a continuous web of the cloth the steps defined in claim 1 and the fifth step of continuously and progressively subjecting the cloth to a plurality of acid neutralizing and liquid-extracting operations to neutralize any acid remaining in the cloth.

3. The method of continuously and progressively preparing for fulling cloth containing animal fibre, as it comes from the loom, which comprises simultaneously performing in sequence upon a continuous web of the cloth the following steps, first, continuously, progressively and successively (a) passing the cloth through a bath of a liquid solvent for oleaginous foreign substances contained in the cloth, (b) extracting by suction the principal part of the solvent and solvent retained foreign substances remaining in the cloth, (c) heating the cloth sufficiently to vaporize the solvent remaining therein and (d) separating the cloth from the solvent vapor, second, continuously and progressively treating the cloth for carbonizing and carbonizing foreign vegetable material in the cloth and, third, continuously and progressively applying a crushing action to the cloth to free the carbonized material therefrom.

4. The method of continuously and progressively preparing for alkaline or soap fulling cloth containing animal fibre, as it comes from the loom, which comprises simultaneously performing in sequence upon a continuous web of cloth the steps defined in claim 3, and the fourth step of continuously and progressively treating the cloth to neutralize any acid remaining in the cloth.

5. The method of continuously and progressively preparing for fulling cloth containing animal fibre, as it comes from the loom, which comprises simultaneously performing in sequence upon a continuous web of the cloth the following steps, first, continuously, progressively and successively (a) passing the cloth through a bath of a liquid solvent for oleaginous foreign substances contained in the cloth, (b) passing the cloth through a narrow transverse zone in which the air pressure on one face of the cloth in said zone as it passes therethrough is maintained sufficiently less than that upon the other face to effect the extraction of the principal part of the solvent and solvent-retained foreign substances remaining in the cloth, (c) heating the cloth sufficiently to vaporize the solvent remaining therein and (d) separating the cloth from the solvent vapor, second, continuously, progressively and successively (a) moistening the cloth, (b) passing the moistened cloth through an acid bath (c) expressing the acid from the cloth, third, (a) continuously and progressively stretching the cloth to a predetermined width and while maintained thus stretched continuously and progressively drying the cloth and (b) then continuously and progressively baking the cloth to carbonize foreign vegetable material therein and, fourth, continuously and progressively subjecting the cloth to a plurality of crushing operations to free the carbonized material therefrom.

6. The method of continuously and progressively preparing for fulling cloth containing animal fibre, as it comes from the loom, which comprises simultaneously performing in sequence upon a continuous web of the cloth the following steps, first, continuously, progressively and successively (a) passing the cloth through a bath of a liquid solvent for oleaginous foreign substances contained in the cloth, (b) passing the cloth through a narrow transverse zone in which the air pressure on one face of the cloth in said zone as it passes therethrough is maintained sufficiently less than that upon the other face to effect the extraction of the principal part of the solvent and solvent-retained foreign substances remaining in the cloth, (c) heating the cloth sufficiently to vaporize the solvent remaining therein and (d) separating the cloth from the solvent vapor, second, continuously and progressively treating the cloth for carbonizing and carbonizing foreign vegetable material in the cloth and, third, continuously and progressively applying a crushing action to the cloth to free the carbonized material therefrom.

ROLAND E. DERBY.